C. B. KING.
AUTOMOBILE FRAME.
APPLICATION FILED JULY 21, 1910.

1,052,151.

Patented Feb. 4, 1913.
4 SHEETS—SHEET 1.

Witnesses
C. B. Baenziger.
Lotta Lee Bray.

Inventor
Charles B. King
By Parker V Burton
Attorneys

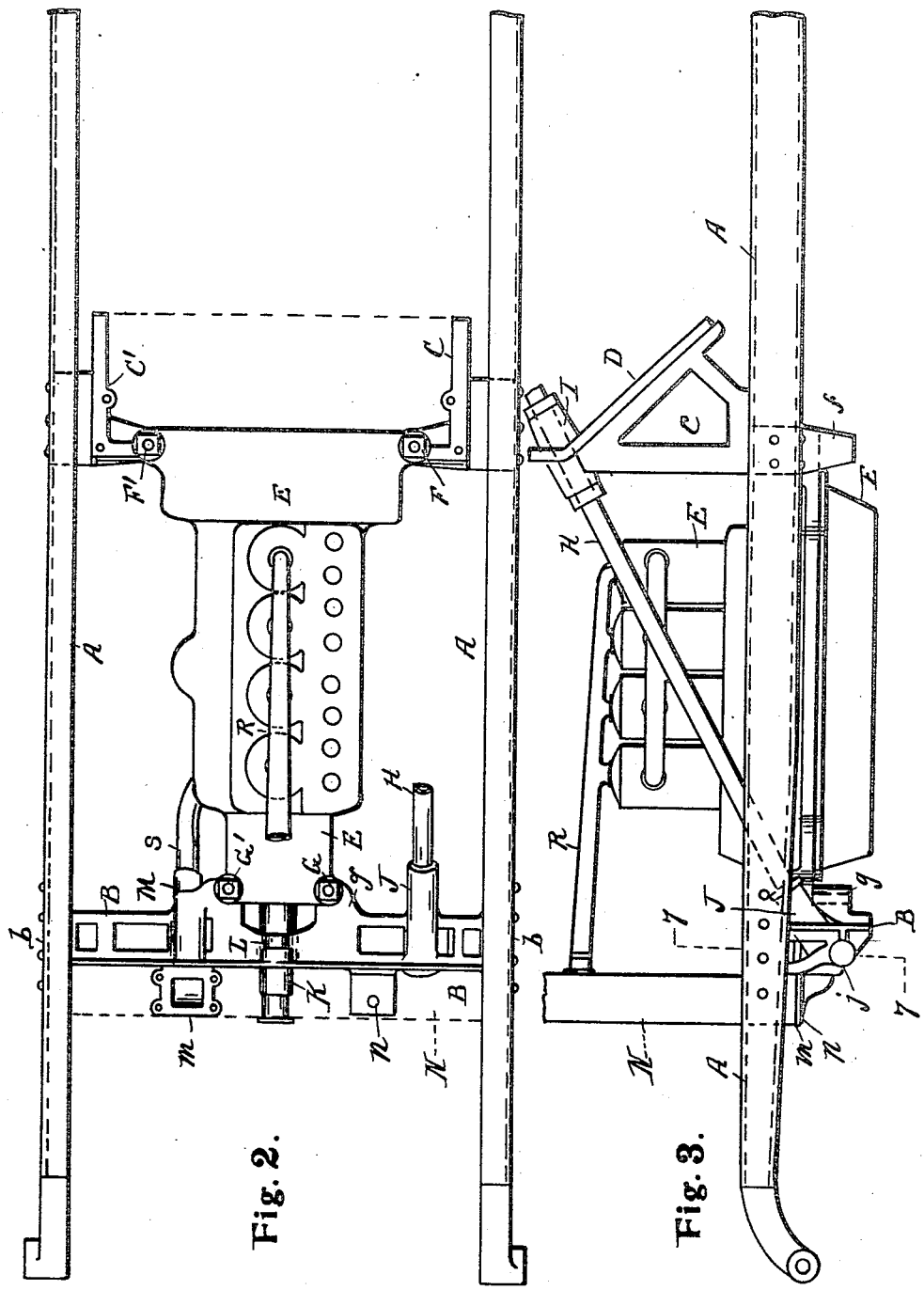

C. B. KING.
AUTOMOBILE FRAME.
APPLICATION FILED JULY 21, 1910.
1,052,151.
Patented Feb. 4, 1913.
4 SHEETS—SHEET 3.
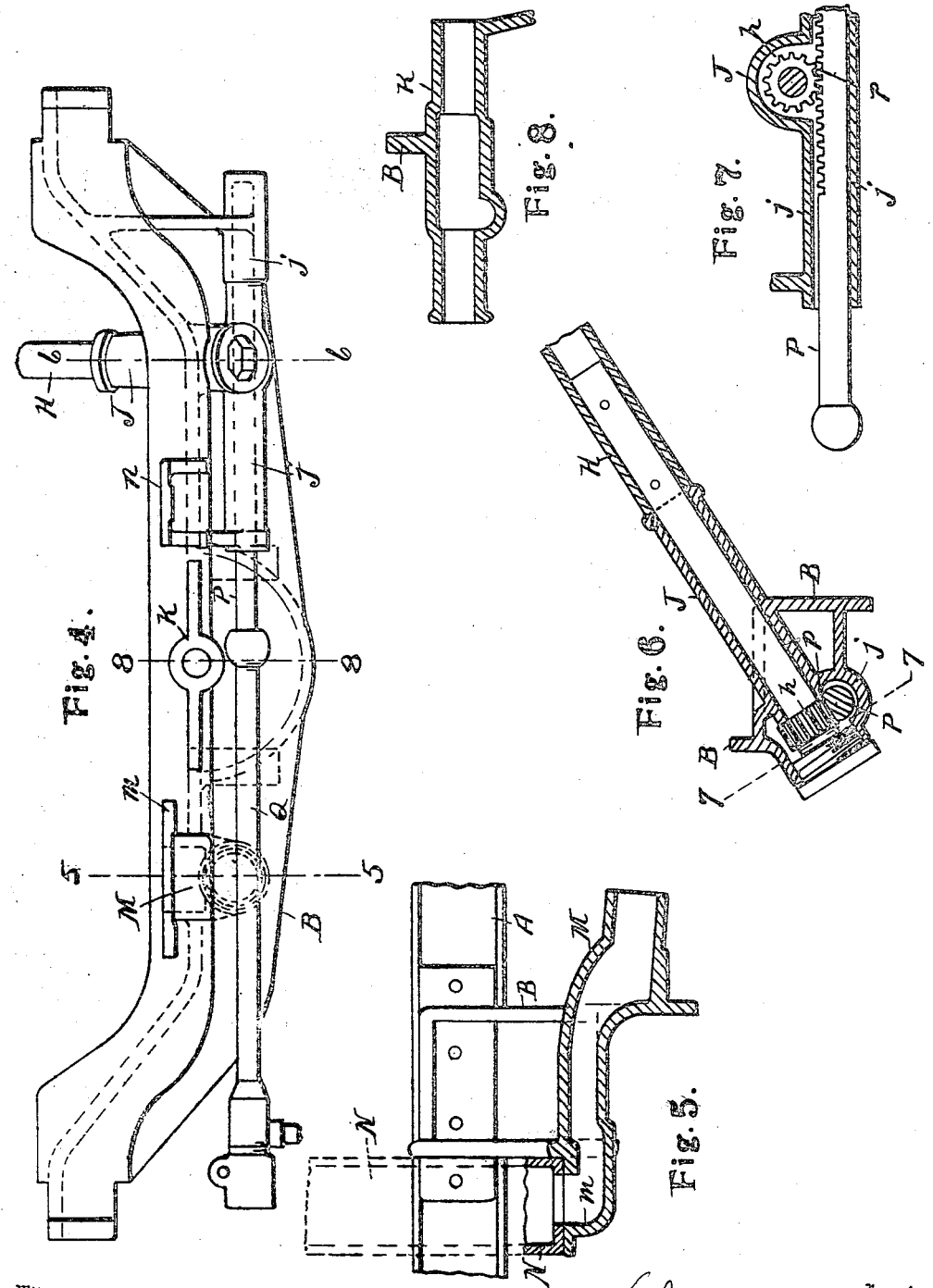
Witnesses
O. B. Baenziger
Lotta Lee Bray
Inventor
Charles B. King
By Parker & Burton
Attorneys

C. B. KING.
AUTOMOBILE FRAME.
APPLICATION FILED JULY 21, 1910.

1,052,151.

Patented Feb. 4, 1913.

4 SHEETS—SHEET 4.

UNITED STATES PATENT OFFICE.

CHARLES B. KING, OF DETROIT, MICHIGAN, ASSIGNOR, BY DIRECT AND MESNE ASSIGNMENTS, TO KING MOTOR CAR COMPANY, OF DETROIT, MICHIGAN, A CORPORATION OF MICHIGAN.

AUTOMOBILE-FRAME.

1,052,151.          Specification of Letters Patent.      Patented Feb. 4, 1913.

Application filed July 21, 1910. Serial No. 572,953.

*To all whom it may concern:*

Be it known that I, CHARLES B. KING, a citizen of the United States, residing at Detroit, county of Wayne, State of Michigan, have invented a certain new and useful Improvement in Automobile-Frames, and declare the following to be a full, clear, and exact description of the same, such as will enable others skilled in the art to which it pertains to make and use the same, reference being had to the accompanying drawings, which form a part of this specification.

My invention relates to automobile frames and the object of my improvements is to provide an improved automobile frame which shall be light and strong and which shall utilize constituent parts of the automobile to form the structure of the frame. I accomplish this object in the device illustrated in the accompanying drawings, in which,—

Figure 1:
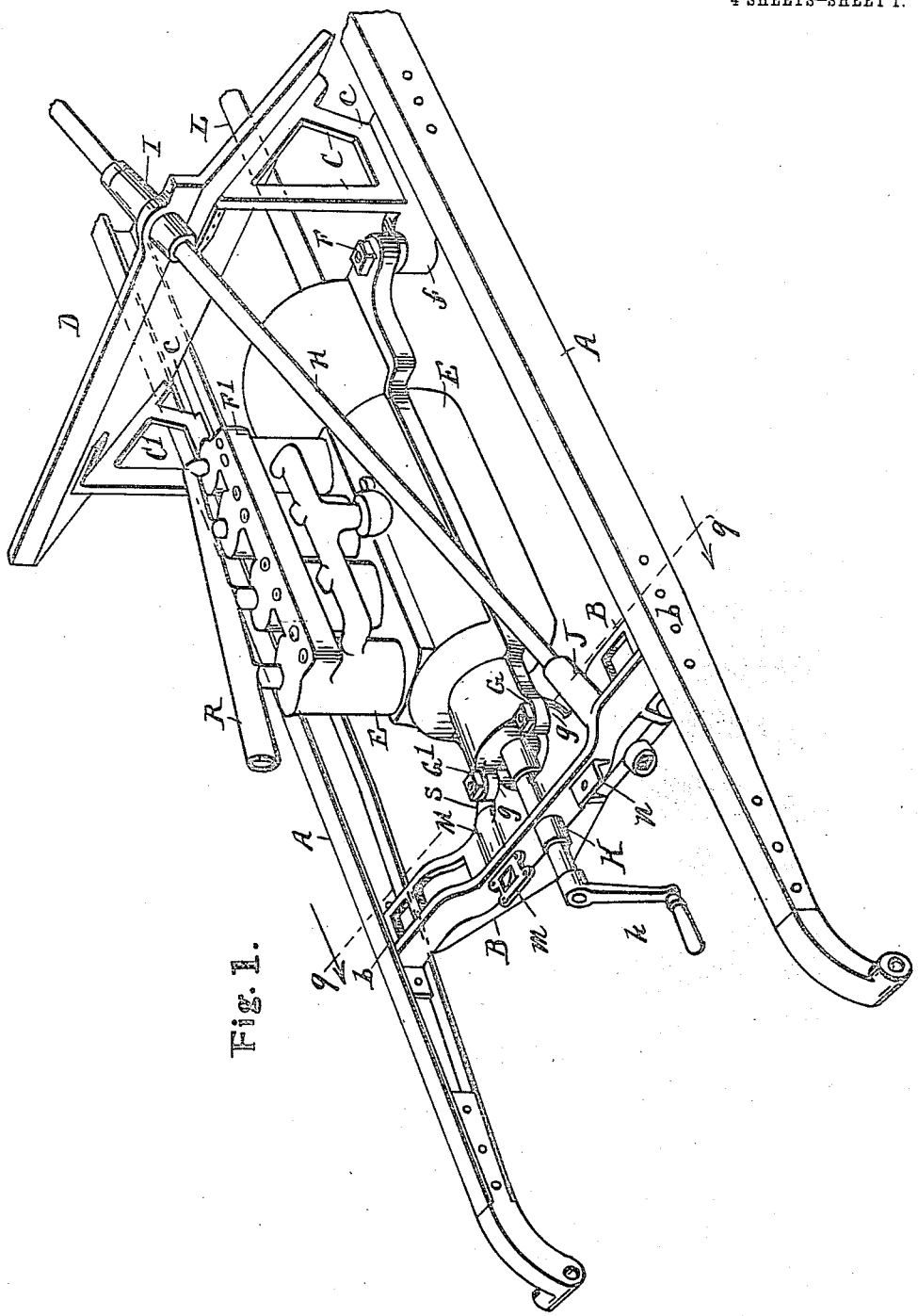
Figure 9:
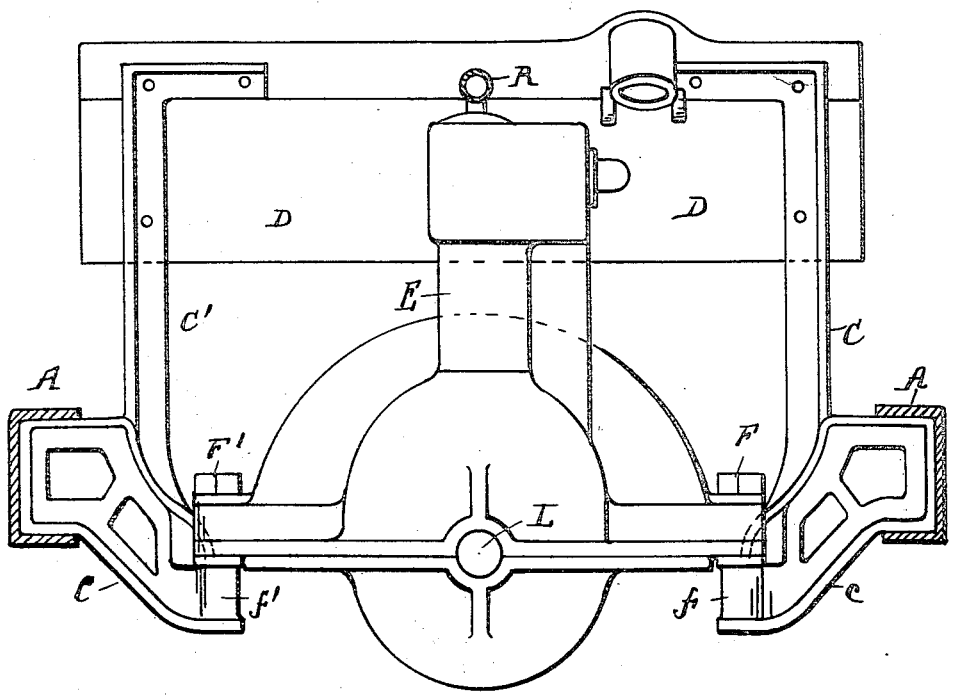
Figure 10:
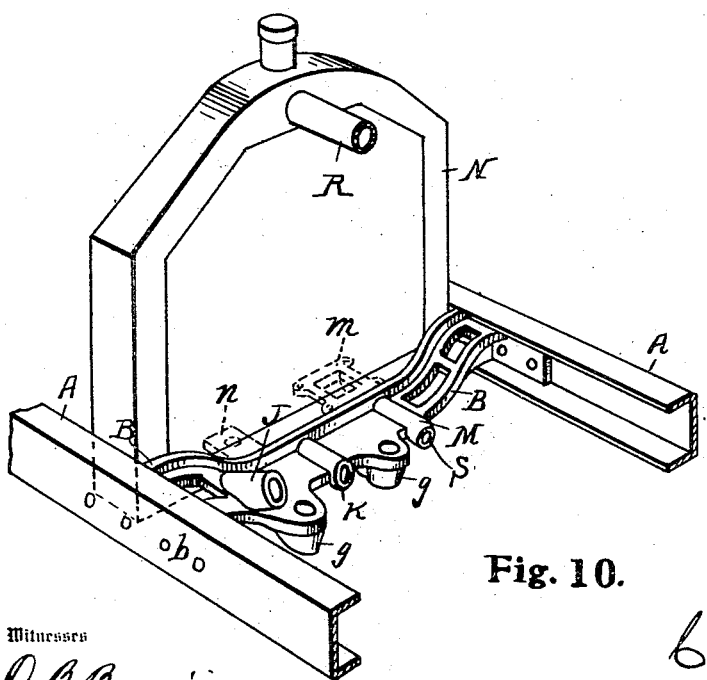

Figure 1, is a perspective view of a part of an automobile frame embodying my invention. Fig. 2, is a plan, and Fig. 3, is a side elevation of the parts shown in Fig. 1. Fig. 4, is an elevation of the front cross piece of the frame on an enlarged scale. Fig. 5, is a section on the line 5—5 of Fig. 4. Fig. 6, is a section on the line 6—6 of Fig. 4. Fig. 7, is a detailed sectional view, the section being taken at about the line 7—7 of Fig. 3. Fig. 8, is a section on the line 8—8 of Fig. 4. Fig. 9, is an elevation of the apparatus shown in Fig. 1, looking from the front of said figure, the side pieces of the frame, or chassis, being shown in section and the front cross piece removed. The section is taken at about the line 9—9 of Figs. 1 and 2. Fig. 10, is a detail perspective view of the front cross piece of the frame with the radiator attached thereto, and a part of the side pieces of the frame or chassis. The view is taken from such a position as to show the part of said cross piece which is toward the center of the frame.

A, A, are the side pieces of the chassis or frame of the automobile. B, is a cross piece secured at its ends at $b, b$, to the side pieces A, A. C, $C^1$, are brackets secured at $c, c$, opposite each other, to side pieces A, A. D, is a foot-board rigidly secured toward its ends to the upper edges of the brackets C, $C^1$. The foot-board D is made of metal preferably of aluminum. E, is the engine, or power plant. This is secured at F, $F^1$, by bolts to lugs $f, f$, on the brackets C, $C^1$, toward the lower ends of said brackets. The engine E is also secured at G, $G^1$, to lugs $g, g$, upon the cross piece B. It will be observed that by this construction, there is secured a strong braced frame work, the foot-board D secured to the upper portion of the brackets C, $C^1$, and the engine secured between the lower ends of said brackets forms a strong braced or girder construction joining the side pieces A, A. The engine E secured near the center of the cross piece B and at F, $F^1$, to the brackets C, $C^1$, adjacent to the side pieces A, A, forms a rigid construction to resist horizontal distortion of the frame. The cross piece B is a rigid casting including other parts in its construction, as hereinafter described and serves to firmly join the side pieces A, A, and prevent distortion of the frame.

J, is a socket formed integral with the cross piece B, toward one end thereof.

I, is a bearing on the foot board D, axially in line with the socket J.

H, is the steering post resting and adapted to turn in the bearing I and, at its end, bearing in the socket J.

$h$, (see Fig. 6) is a gear wheel on the forward end of the steering post H.

$j$ (Figs. 4 and 7) is a tubular way or socket extending horizontally transversely of the frame and formed integral with the cross piece B. In the way $j$ is a rod P, fitting and adapted to slide in said way, the rod P is provided with a rack, or gear teeth, $p$ (Fig. 7) which engage the teeth of the gear wheel $h$. By turning the steering post H, the rod P is moved in the direction of its length along the way $j$ and may be connected in any convenient manner, as by a rod Q (Fig. 4) with the steering wheels of the vehicle (not shown) in the usual manner.

K, is a tubular shell having cylindrical walls and extending in the direction of the length of the vehicle at the center of the casting B and forming an integral part thereof. There is an opening through the tubular part K, axially in line with the main shaft L (Figs. 1 and 2) of the engine. The shaft of the starting crank $k$ (Fig. 1) passes through the opening of the shell K and engages the main shaft L of the engine.

M, is a shell formed integral with the cross piece B and having an open passage therethrough terminating at its outer end in the horizontal upper surface of a lug *m* and adapted at its inner end to be connected with the lower portion of the water jacket of the engine E.

*n*, is a lug or support having a horizontal upper surface in the same horizontal plane as the surface of *m*.

N, is a radiator supported upon the upper surfaces of the lugs *m* and *n* and bolted to said lugs. The radiator N is provided with an opening which registers with the opening through the surface *m* and said radiator is bolted to the lugs *n* and *m* so as to form a tight joint between the adjacent surfaces of said radiator and lug *m* and to form a passage for the water from said radiator through the passage in the shell M.

By the above construction of the cross piece B and parts connected therewith, a compact construction is secured that is strong and the parts are compactly and conveniently located and are not liable to be injured or broken, and the cross piece B is light, strong and rigid.

What I claim is:—

1. In an automobile frame, the combination of the side pieces A, A, two brackets, one of said brackets being secured to one of said side pieces and the other of said brackets to the other of said side pieces, means uniting a point on one of said brackets with a point on the other of said brackets, and a power plant securing said brackets together betwen points remote from the points joined by said uniting means, for the purpose described.

2. In an automobile frame, the combination of the side pieces A, A, a bracket secured to each of said side pieces, a footboard uniting the ends of said brackets, and a power plant secured to said brackets remote from said uniting means.

3. In an automobile frame, the combination of the side pieces A, A, a bracket secured to each of said side pieces, means uniting the ends of said brackets, a cross piece B, secured to said side pieces, and a power plant secured to said brackets remote from said uniting means and to said cross-pieces between said side pieces.

4. In an automobile frame, a cross piece B having the socket for the steering post formed integral therewith and provided with the shell *j* formed integral therewith and adapted to form a way for the part P, the hollow of said socket joining the hollow of said way.

5. The combination of a cross piece to an automobile frame, having a shell M integral therewith, said shell being provided with a passage adapted to form a part of the water circulating system, and a surface on said cross piece forming part of the upper surface of the same and provided with an aperture communicating with said passage, and a radiator having a surface adapted to fit against said surface on said cross piece, and an opening in said radiator surface adapted to register with the opening in said surface on said cross piece.

6. The combination of a cross piece of an automobile frame having a water passage therein, said cross piece being provided with a lug *m* having an upper surface, said lug having a passage terminating in said surface and in the passage in said cross piece, a radiator N secured upon said lug and having an opening communicating with said passage.

In testimony whereof, I sign this specification in the presence of two witnesses.

CHARLES B. KING.

Witnesses:
LOTTA LEE BRAY,
ELLIOTT J. STODDARD.